United States Patent [11] 3,615,640

[72] Inventors Yoshiyuki Nakazawa;
  Masao Sawahara; Akira Sato; Masanao Hinata, all of Kanagawa, Japan
[21] Appl. No. 732,062
[22] Filed May 27, 1968
[45] Patented Oct. 26, 1971
[73] Assignee Fuji Photo Film Co., Ltd
  Kanagawa, Japan
[32] Priority May 26, 1967
[33] Japan
[31] 42/33473

[54] PHOTOGRAPHIC SILVER HALIDE EMULSIONS CONTAINING BENZOTHIAZOLE CYANINE SENSITIZERS
3 Claims, No Drawings

[52] U.S. Cl.................................................. 96/133,
  96/132, 96/134, 96/135, 96/137, 96/138, 96/142,
  260/240.4, 260/240.6, 260/240.7
[51] Int. Cl....................................................... G03c 1/08,
  G03c 1/10
[50] Field of Search.......................................... 96/102,
  106; 260/240, 240.1, 240.4, 304

[56] References Cited
UNITED STATES PATENTS
2,647,050 7/1953 Firestine...................... 96/106
2,928,839 3/1960 Roth et al..................... 96/106
3,080,363 3/1963 Horwitz et al................ 96/106
3,148,187 9/1964 Haseltine...................... 96/106

OTHER REFERENCES
Levkoev et al., Chemical Abstracts, Vol. 49, pages 5443– 5, (1955)

Primary Examiner—J. Travis Brown
Attorney—Sughrue, Rothwell, Mion, Zinn & Macpeak ABSTRACT: A photographic silver halide emulsion containing at least one sensitizing dye represented by the formula I or II;

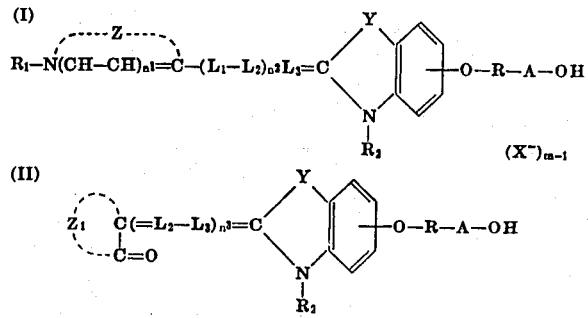

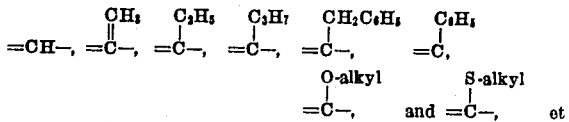

wherein R represents a divalent hydrocarbon group having one-four carbon atoms, $R_1$ and $R_2$ each represents an alkyl group having one to four carbon atoms, a substituted alkyl group such as 2-hydroxyethyl group, a 2-acetoxyethyl group, a 3-hydroxypropyl group, a carboxymethyl group, a 2-carboxyethyl group, a 3-carboxypropyl group, a 2-sulfoethyl group, a 3-sulfopropyl group, a 4-sulfobutyl group, an allyl group (i.e., a vinyl methyl group), a benzyl group (i.e., a phenyl methyl group), a phenylethyl group, or a phenoxyethyl group, A represents $SO_2$ or CO, $L_1$ and $L_2$ and $L_3$ represent methine groups such as $$=CH-,\ =\overset{CH_3}{\underset{\|}{C}}-,\ =\overset{C_2H_5}{\underset{|}{C}}-,\ =\overset{C_3H_7}{\underset{|}{C}}-,\ =\overset{CH_2C_6H_5}{\underset{|}{C}}-,\ =\overset{C_6H_5}{\underset{|}{C}}-,$$

$$=\overset{O\text{-alkyl}}{\underset{|}{C}}-,\ \text{and}\ =\overset{S\text{-alkyl}}{\underset{|}{C}}-,\ \text{et}$$

$n_1$ represents 0 or 1, $n_2$ represents 0, 1 or 2, $n_3$ represents 1 or 2. $m$ represents 1 when the intramolecular salt is formed, or 2 when the intramolecular salt is not formed, $X^1$ represents an anion such as chloride ion, bromide ion, iodide ion, perchlorate ion, p-toluene-sulfonate ion, benzene sulfonate ion, ethyl sulfate ion, Y represents S or Se, Z represents nonmetallic atoms necessary to complete a heterocyclic ring used in cynanine dyes such as thiazoles, thiadiazoles, benzothiazoles, naphthothiazoles, oxazoles, benzoxazoles, naphthoxazoles, selenazoles, benzoselenazoles, naphthoselenazoles, thiazolines, oxazolines, selenazolines, indolenines pyridines 2-quionolines, 4-quinolines, benzimidazoles, $Z_1$ represents nonmetallic atoms necessary to complete a heterocyclic ring usually used in merocyanine dyes, selected from rhodanines pyrazolones, 2-thiohindantoines, isoxazolones, oxyindoles, 2-thiobarbaolic acids, 2-thio-2,4-oxazolidinediones.

PHOTOGRAPHIC SILVER HALIDE EMULSIONS CONTAINING BENZOTHIAZOLE CYANINE SENSITIZERS

BACKGROUND OF THE INVENTION

1. Field of the Invention

This invention relates to a photographic silver halide emulsion containing a sensitizing dye and more particularly to a photographic silver halide emulsion containing a novel sensitizing dye having a sulfo-substituted alkoxyl group or a carboxyl-substituted alkoxyl group at the benzene nucleus forming a heterocyclic ring therewith.

2. Discussion of Prior Art

It is well known to spectrally sensitize a photographic silver halide emulsion by incorporating a sensitizing dye so that the light-sensitive wavelength region of the silver halide emulsion is enlarged to a longer wavelength side. This is called spectral sensitization. The degree of spectral sensitization is influenced by the chemical structure of the sensitizing dye and by the properties of the emulsion, such as the specific composition and specific crystal structure of the silver halides, the specific concentration of the silver ion, the specific concentration of the hydrogen ion and the like as well as the specific types of additives employed such as stabilizers, wetting agents, hardening agents or color couplers.

In particular, additives are known to significantly reduce the spectral sensitivity of the emulsion. For instance, additives such as couplers incorporated into the emulsion with the sensitizing dye, result in remarkably reduced spectral sensitivity when the emulsion is in the liquid state prior to coating onto a support. It is, therefore, difficult to obtain a satisfactorily stabilized photographic silver halide emulsion having a high spectral sensitivity.

It is therefore an object of this invention to provide a photographic silver halide emulsion having a high spectral sensitivity, in which the degree of spectral sensitization is not reduced when the emulsion is held in an emulsion state prior to coating on a support.

Further, it is the object of this invention to provide a photographic silver halide emulsion having a high spectral sensitivity containing a sensitizing dye and a coupler, in which the spectral sensitivity is not reduced when the emulsion is held in an emulsion state prior to coating on a support.

SUMMARY OF THE INVENTION

According to the present invention, there is provided a photographic silver halide emulsion containing at least one sensitizing dye represented by the general formula (I) or (II);

(I)

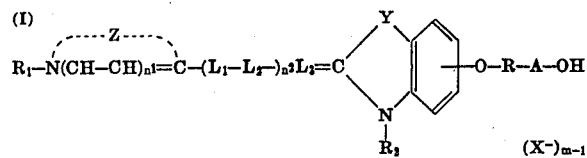

(II)

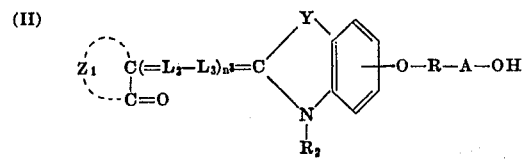

wherein R represents a divalent hydrocarbon group having one-fourth carbon atoms, $R_1$ and $R_2$ each represents an alkyl group having one-fourth carbon atoms, a substituted alkyl group such as a 2-hydroxyethyl group, a 2-acetoxyethyl group, a 3-hydroxypropyl group, a carboxymethyl group, a 2-carboxyethyl group, a 3-carboxypropyl group, a 2-sulfoethyl group, a 3-sulfopropyl group, a 4-sulfobutyl group, an allyl group (i.e., a vinyl methyl group), a benzyl group (i.e., a phenyl methyl group), a phenylethyl group, or a phenoxyethyl group, A represents $SO_2$ or CO, $L_1$ and $L_2$ and $L_3$ represent methane groups such as

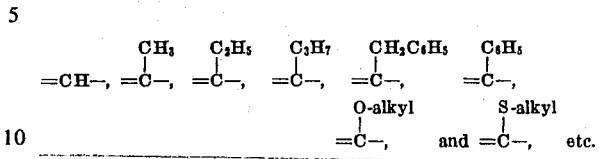

$n_1$ represents 0 or 1, $n_2$ represents 0, 1 or 2, $n_3$ represents 1 or 2. $m$ represents 1 when the intramolecular salt is formed, or 2 when the intramolecular salt is not formed, $X^1$ represents an anion such as chloride ion, bromide ion, iodide ion, perchlorate ion, p-toluene-sulfonate ion, benzene sulfonate ion, ethyl sulfate ion, Y represents S or Se, Z represents nonmetallic atoms necessary to complete a heterocyclic ring used in cyanine dyes such as thiazoles, thiadiazoles, benzothiazoles, naphthothiazoles, oxazoles, benzoazoles, naphthoxazoles, selenazoles, benzoselenazoles, naphthoselenazoles, thiazolines, oxazolines, selenazolines, indolenines pyridines 2-quinolines, 4-quinolines, benzimidazoles, $Z_1$ represents nonmetallic atoms necessary to complete a heterocyclic ring usually used in merocyanine dyes, selected from rhodanines pyrazolones, 2-thiohindantoines, isoxazolones, oxyindoles, 2-thiobarbatolic acids, 2-thio-2,4-oxazolidinediones.

DETAILED DESCRIPTION OF THE INVENTION

The photographic silver halide emulsions in this invention containing at least one sensitizing dye represented by the above-mentioned general formula (I) or (II) provide a high degree of spectral sensitivity, and more particularly, even if the coupler is incorporated into the emulsion containing the sensitizing dye, the degree of spectral sensitivity is not reduced when the emulsion is held in an emulsion state prior to coating on a support.

The method for providing the sensitizing dyes used in this invention can be conducted by a condensation process using the compound represented by the following general formula (III);

(III)

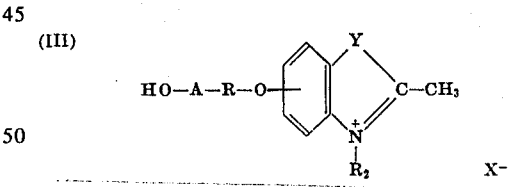

wherein $R_1$, $R_2$, Y and $X^1$ each represents the same as in the above-mentioned general formulas (I) and (II).

The compound (III) was obtained by the reaction of the compound represented by the following general formula (IV) with the compound represented by the general formula (V) and then converting to the quarternary salt thereof.

(IV)

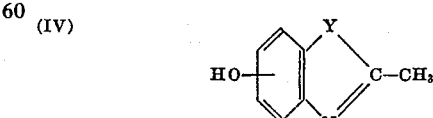

(V)

A
V
\O (VI)

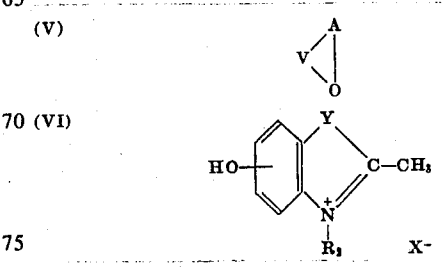

wherein Y, R and A represent the same as in a general formula (I). And A represents $SO_2$, the compound (III) is also obtained by the reaction of the quarternary salt compound having a hydroxyl group represented by the above-mentioned general formula (VI) with the compound (V), such as propanesultone, butanesultone 3-methyl propane-sultone, β-propiolactone or γ-butyrolactone.

The following example discloses the preparation of the sensitizing dye used in this invention.

SYNTHESIS 1

Sodium-2-methyl-6-(4-sulfobutoxy)benzothiazole

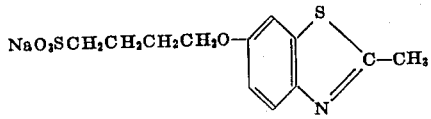

1.4 g. of sodium was added to 60 ml. of ethanol to provide a sodium ethylate solution, and then 10 g. of 6-hydroxy-2-methylbenzothiazole dissolved into 70 ml of ethanol was added and further 9.0 g. of butanesultone was added to the resulting mixed solution and standing for 40 hours at a room temperature. The precipitated product was filtered off and recrystallized from a mixed solvent of methanol and isopropanol. The yield thereof was 14 g., m.p. above 300° C. dec.

SYNTHESIS 2

Sodium 2-methyl-6-(3-methyl-3-sulfopropoxy)benzothiazole

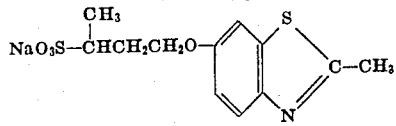

The crystal of the above-mentioned compound was obtained by the same manner of synthesis 1, but by using 9 g. of 3-methyl propansultone instead of 9g. of butansultone in synthesis 1.

The yield was 13 g., m.p. above 300° C. dec.

SYNTHESIS 3

Sodium 2-methyl-5-(3-sulfopropoxy)benzothiazole

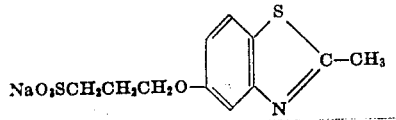

The crystal of the above-mentioned compound was obtained by the same manner of synthesis 1, but by using 10 g. of 5-hydroxy-2-methyl benzothiazole and 7.5 g. of propanesultone, instead of 10 g. of 6-hydroxy-2-methyl benzothiazole and 9 g. of butanesultone in Synthesis 1.

The yield thereof was 14 g., m.p. above 300° C. dec.

SYNTHESIS 4

Sodium 2-methyl-5-(3-methyl-3-sulfopropoxy)benzothiazole

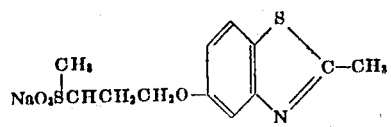

The crystal of the above-mentioned product was obtained by the same manner of synthesis 1, but by using 10 g. of 5-hydroxy-2-methyl benzothiazole and 9 g. of 3-methyl propane-sultone, instead of 10 g. of 6-hydroxy-2-methylbenzothiazole and 9 g. of butanesultone in synthesis 1.

The yield thereof was 15 g., m.p. above 300° C. dec.

SYNTHESIS 5

Sodium 2-methyl-5-(4-sulfobutoxy)benzoselenazole

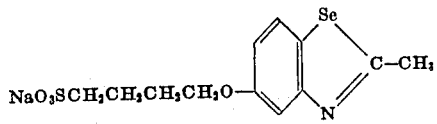

The crystal of the above-mentioned compound was obtained by the same manner of synthesis 1, but by using 10 g. of 5-hydroxy-2-methyl benzoselenazole and 6.5 g. of butanesultone, instead of 10 g. of 6-hydroxy-2-methylbenzothiazole and 9 g. of butanesultone.

The yield thereof was 13 g., m.p. above 300° C. dec.

SYNTHESIS 6

6-(β-carboxyethoxy)-2-methylbenzothiazole

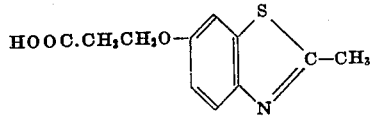

16.5 g. of 6-hydroxy-2-methylbenzothiazole was added to the solution consisting of 4 g. of sodium hydroxide and 40 ml of water, and the resulting solution was heated at 100° C., further 7.2 g. of β-propiolactone was dropped into it and was stirred.

The resulting solution was reacted for 15 minutes. After ice-cooling, 10 ml of condensed hydrochloric acid was added to the solution to make it acidified.

The precipitated crystal was filtered off and washed with water to make it neutralized, and recrystallized from ethanol.

The yield thereof was 5 g., m.p. 200° C.

SYNTHESIS 7

5-(β-carboxyethoxy)-2-methylbenzothiazole

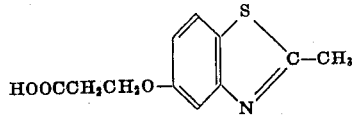

The crystal of the above-mentioned compound was obtained by the same manner of synthesis 6, but by using 6.5 g. of 5-hydroxy-2-methyl-benzothiazole instead of 6-hydroxy-2-methyl-banzothiazole in synthesis 6. The yield thereof was 6g., m.p. 133° C.

SYNTHESIS 8

Anhydro 3-ethyl-2-methyl-5-(3-sulfopropoxy)benzothiazolium hydroxide

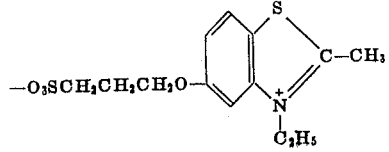

10 g. of 5-hydroxy-2-methylbenzothiazole and 13.5 g. of paratoluene sulfonic acid ethyl were reacted at 140° C. for four hours. After cooling the resulting solution, acetone was added to it and stirred to provide a crystal.

The crude crystal thus formed was filtered off and recrystallized from a mixed solvent of methanol and isopropanol to provide 21 g. of 3-ethyl-5-hydroxy-2-methyl benzothiazolium para-toluene sulfonate having a melting point of 182° C.

20 g. of the product thus formed and 14 g. of propanesultone were heated at 190° C. for 20 hours, and then, after cooling, acetone was added to it and heated to be dissolved. After cooling the resulting solution, further, ether was added to it and stirred. And then, ether layer of the solution was removed off by decantation. When 40 ml of pyridine was added to the residual solution and heated, the crude crystal was precipitated. After cooling, the crude crystal was filtered off and recrystallized from a mixed solvent of methanol and isopropanol.

The yield thereof was 8 g., m.p. 242°–244° C. dec.

SYNTHESIS 9

Anhydro 3-ethyl-2-methyl-6-(3-sulfopropoxy)benzothiazolium hydroxide

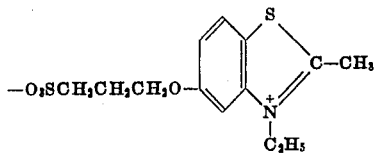

20 g. of 6-hydroxy-2-methylbenzothiazole and 27 g. of paratoluene sulfonic acid ethyl were heated at 140° C. for four hours. After cooling, acetone was added to the resulting solution to provide a crystal. The crude crystal thus formed was filtered off and recrystallized from a mixed solvent of methanol and isopropanol to provide 3.9 g. of 3-ethyl-6-hydroxy-2-methylbenzothiazolium-para-toluenesulfonate having a melting point of 166° C. 20 g. of the product thus formed and 14 g. of propanesultone were reacted by the same manner of the Synthesis 8 to provide the crystal of above-mentioned compound.

The yield thereof was 9 g., m.p. 268° C. dec.

SYNTHESIS 10

Anhydro 3-ethyl-2-methyl-5-(3-sulfopropoxy)benzoselenazolium hydroxide

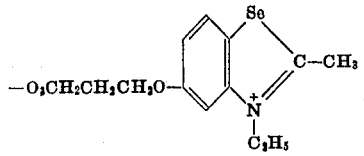

25 g. of 5-hydroxy-2-methylbenzoselenazolium and 26 g. of para-toluene sulfonic acid ethyl were heated at 140° C. for four hours. After cooling, acetone was added to the resulting solution and stirred to provide a crystal.

The crude crystal was filtered off and recrystallized from a mixed solvent of methanol and isopropanol to provide 3 g. of 3-ethyl-5-hydroxy-2-methyl benzoselenazolium paratoluenesulfonate having a melting point of 191° C.

20 g. of the product thus formed and 14 g. of propanesultone were heated at 190° C. for 30 hours and then treated with the same manner of synthesis 8 to provide a crystal.

The yield thereof was 5 g., m.p. 255°–256° C. dec.

SYNTHESIS 11

Anhydro 1,3'-diethyl-6-methyl-6'-(3-sulfopropoxy)thia-2-cyanine hydroxide (VII)

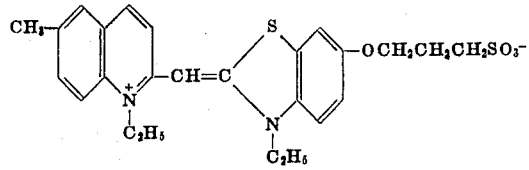

2.4 g. of anhydro-3-ethyl-2-methyl-6-(3-sulfopropoxy) benzothiazolium hydroxide and 2.7 g. of 1-ethyl-6-methyl-2-methylthioquinolium iodide were dissolved in 120 ml of ethanol and 30 ml of methanol, under heating.

4 ml. of triethylamine was added to the solution and the resulting solution was boiled for 30 minutes under refluxing.

The precipitated dye was filtered off and twice recrystallized from a mixed solvent of methanol and chloroform.

The yield thereof was 1.8 g., m.p. above 300° C. dec. λ $_{max.}^{MeOH}$ 497.5 mμ.

SYNTHESIS 12

Anhydro 1,3'-diethyl-6-methyl-5'-(3-sulfopropoxy) selena-2-cyaninehydroxide (VIII)

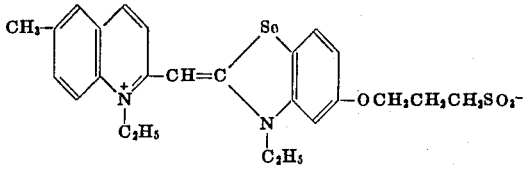

2 g. of anhydro-3-ethyl-2-methyl 5-(3-sulfopropoxy) benzoselenazolium hydroxide.

2 g. of 1-ethyl-2-ethylthio-6-methylquinolium ethyl sulfate, 100 ml. of ethanol and 3 ml of triethylamine were boiled for one hour under refluxing. After the reaction, the solution was condensed and cooled. The precipitated dye was filtered off and washed with acetone and then washed with water.

The crude crystal thus formed was twice recrystallized from a mixed solvent of methanol and chloroform.

The yield thereof was 1 g. and m.p. above 300° C. dec. λ $_{max.}^{MeOH}$ 504 mμ.

SYNTHESIS 13

Anhydro 1, 3'-diethyl-6-methyl-5'-(3-methyl-3-sulfoproxy)thia-2-cyanine hydroxide (IX)

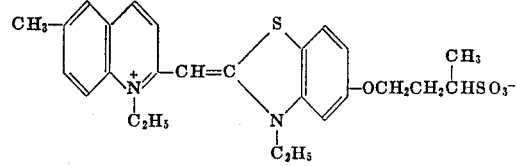

2 g. of sodium 2-methyl-5-(3-methyl-3-sulfopropoxy) benzothiazole and 1.6 g. of para-toluene sulfonic acid ethyl were heated at 140° C. for four hours. After cooling the solution, the quaternary salt was washed with acetone.

The quaternary salt and 1.5 g. of 1-ethyl-6-methyl-2-methyl-thioquinolim iodide were dissolved in 200 ml. of ethanol and 10 ml. of water under heating, and then 6 ml. of triethyl amine was added to the solution. The resulting solution was boiled for 30 minutes under refluxing. After cooling, the precipitated dye was filtered off and washed with water. The crude crystal thus formed was twice recrystallized from a mixed solvent of methanol and chloroform. The yield thereof was 1.4 g., m.p. above 300° C. dec. λ $_{max.}^{MeOH}$ 500 mμ.

SYNTHESIS 14

Anhydro 1,3'-diethyl-6-methyl-5'(4-sulfobutoxy)selena-2-cyanine hydroxide

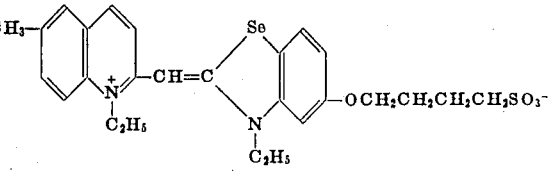

2 g. of sodium 2-methyl-5-(4-sulfobutoxy) benzoselenazole and 1.5 g. of para-toluene sulfonic acid ethyl were heated at 140° C. for four hours. After cooling the solution, the quaternary salt was washed with acetone. The quaternary salt and 2 g. of 1-ethyl-2-ethylthio-6-methylquinolium ethylsulfate were dissolved in 100 ml. of ethanol and 20 ml. of water under heating, and then 6 ml. of trimethyl amine was added to it. The resulting solution was condensed and isopropanol was added to it. After cooling, the precipitated dye was filtered off and washed with isopropanol and then with water. The crude crystal thus formed was twice recrystallized from a mixed solvent of methanol and chloroform.

The yield thereof was 0.7 g., m.p. above 300° C. dec. $\lambda_{max.}^{MeOH}$ 505.5 m$\mu$.

SYNTHESIS 15

Anhydro 3,3'-diethyl-9-methyl-6'-(3-sulfopropoxy) thiacarbocyanine hydroxide (XI)
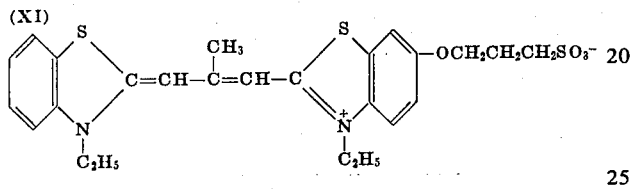

2 g. of anhydro-3-ethyl-2-methyl-6-(3-sulfopropoxy) benzothiazolium hydroxide and 2.8 g. of 3-ethyl-2-(2-ethylthio-2-methylvinyl) benzothiazolium ethylsulfate were dissolved in 200 ml. of ethanol and 20 ml. of methanol under heating.

4 ml. of triethylamine was added to the solution and the resulting solution was boiled for 30 minutes under refluxing. The precipitated dye was filtered off and washed with water. The crude crystal thus formed was recrystallized from a mixed solvent of methanol and chloroform. The yield thereof was 1 g., m.p. 291° C. dec. $\lambda_{max.}^{MeOH}$ 555 m$\mu$.

SYNTHESIS 16

Potassium anhydro 3, 3', 9-triethyl-5, 5'-di(3-sulfopropoxy)thiacarbocyanine hydroxide (XII)
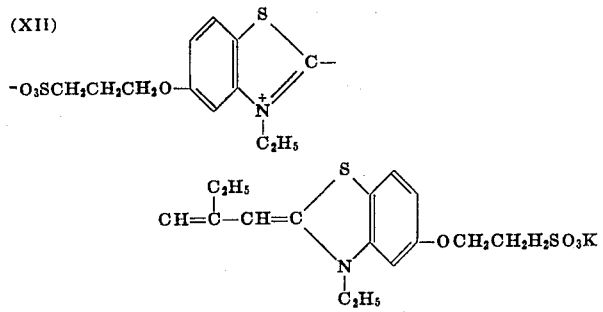

4 g. of anhydro 3-ethyl-2-methyl-5-(3-sulfopropoxy) benzothiazolium hydroxide, 8 g. of 0-propionic acid ethyl ester, 35 ml. of pyridine and 30 ml. of acetic acid were boiled for 40 minutes under refluxing. After the reaction, the solution was condensed under reduced pressure, and then, after cooling, ether was added to the resulting solution and stirred. The ether layer of the solution was removed off by decantation. 80 ml. of methanol was added to the residual solution and dissolved, and then, the methanol solution of potassium acetate was added to the resulting solution to provide a dye. The precipitated dye was filtered off and washed with methanol. The crude crystal thus formed was twice recrystallized from methanol.

The yield thereof was 0.5 g., m.p. 245° C. dec. $\lambda_{max.}^{MeOH}$ 564 m$\mu$.

SYNTHESIS 17

Anhydro 1,3'-diethyl-6'-(3-sulfopropoxy)thia-4-carbocyanine hydroxide (XIII)
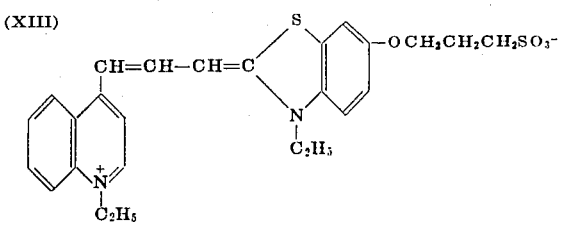

1.4 g. of anhydro-3-ethyl-2-methyl-6-(3-sulfopropoxy) benzothiazolium hydroxide, 2g. of 1-ethyl-4-(2-acetoanilide vinyl) quinolium iodide, 150 ml. of ethanol and 6 ml. of triethyl amine were boiled for 40 minutes under refluxing. After cooling the solution, the precipitated dye was filtered off and washed with ethanol and then with water. The crude crystal thus formed was twice recrystallized from a mixed solvent of methanol, chloroform and isopropanol.

The yield thereof was 1 g., m.p. 287° C. dec. $\lambda_{max.}^{MeOH}$ 647 m$\mu$.

SYNTHESIS 18

Triethyl amine salt of 3-ethyl-5-{2-[3-ethyl-6-(3-sulfopropoxy)benzothiazolinylidine] ethylidene}rhodanine (XIV)
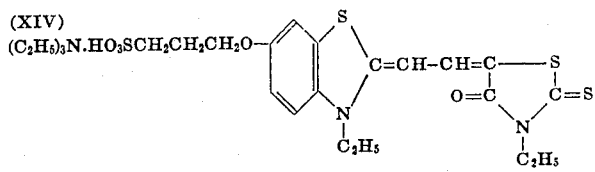

3 g. of anhydro-3-ethyl-2-methyl-6-(3-sulfopropoxy) benzothiazolium hydroxide and 3 g. of 5-acetoanilide methylene-3-ethylrhodanine were dissolved in 160 ml. of ethanol and 30 ml. of methanol under heating. 5 ml. of triethylamine was added to the solution and the resulting solution was boiled for one hour under refluxing.

After the reaction, the solution was condensed and cooled to provide a dye. The precipitated dye was filtered off and washed with acetone. The crude crystal thus formed was twice recrystallized from isopropanol.

The yield thereof was 1.5 g., m.p. 168° C., $\lambda_{max.}^{MeOH}$ 539 m$\mu$.

SYNTHESIS 19

Anhydro 3,3'-diethyl-6'-(3-sulfopropoxy)thiacarbocyanine hydroxide

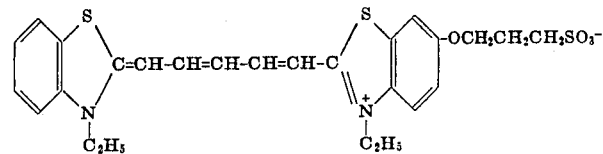

1.1 g. of anhydro-3-ethyl-2-methyl-6-(3-sulfopropoxy) benzothiazolium hydroxide and 1.5 g. of 2-(4-acetoanilide-1, 3-butadienyl)-3-ethylbenzothiazolium iodide were dissolved in 170 ml. of ethanol under heating and further 3 ml. of triethyl amine was added to it. The resulting solution was boiled for 30 minutes under refluxing. After the reaction, the precipitated dye was filtered off and washed twice with water. The crude crystal was twice recrystallized from a mixed solvent of methanol and chloroform.

The yield thereof was 0.7 g., m.p. 255° C. dec. $\lambda_{max.}^{MeOH}$ 661 m$\mu$.

SYNTHESIS 20

Anhydro 3,3'-diethyl-6,6'-di(3-sulfopropoxy)thiacarbocyanine hydroxide (XVI)

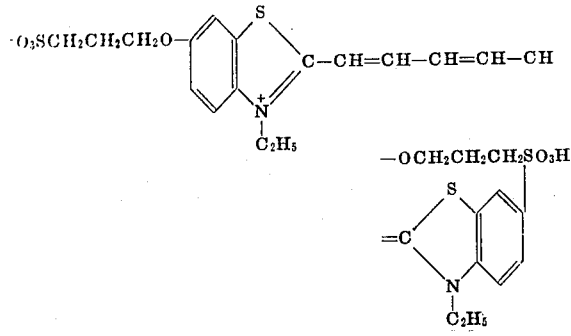

4 g. of anhydro-3-ethyl-6-(3-sulfopropoxy) benzothiazolium hydroxide, 0.7 g. of anilinoacroleineanyl, 30 ml. of pyridine, 35 ml. of acetic acid, 5 ml. of anhydro acetic acid and 5 ml. of triethylamine were boiled for 20 minutes under refluxing.

After the reaction, the solution was cooled, and the precipitated dye was filtered off. The crude crystal thus formed was washed with acetone and recrystallized from a mixed solvent of methanol and ethanol. Then the crystal was dissolved in minimum amount of methanol required under heating. Additional amounts of ethanol containing anhydro hydrochloride was added to the solution to provide a dye.

The precipitated dye was filtered off and washed with methanol. The yield thereof was 0.5 g., m.p. 262° C. dec. $\lambda_{max.}^{MeOH}$ 670 m$\mu$.

SYNTHESIS 21

Anhydro 3,3'-diethyl-5'-(3-sulfopropoxy)thiacarbocyanine hydroxide (XVII)

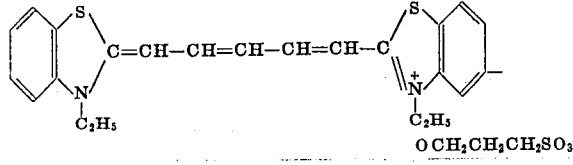

1 g. of anhydro-3-ethyl-2-methyl-5-(3-sulfopropoxy) benzothiazolium hydroxide and 1.4 g. of 2-(4-acetoanilido-1, 3-butadienyl)-3-ethyl-benzothiazolium iodide were dissolved in 180 ml of ethanol and 30 ml of methanol under heating. 4 ml of triethylamine was added to the solution and the resulting solution was boiled for 40 minutes under refluxing.

After the reaction, the solution was condensed and cooled. The precipitated dye was filtered off and washed with acetone, and then, with water. The crude crystal thus formed was twice recrystallized from a mixed solvent of methanol and chloroform. The yield thereof was 0.5 g., m.p. 235° C. dec. $\lambda_{max.}^{MeOH}$ 664 m$\mu$.

SYNTHESIS 22

Anhydro 3,3'-diethyl-6'-(4-sulfobutoxy(thiacarbocyanine hydroxide (XVIII)

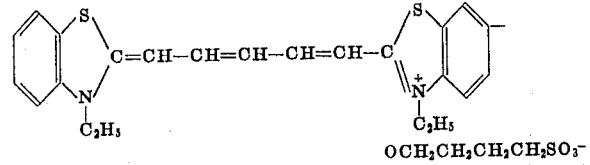

1 g. of sodium 2-methyl-6-(4-sulfobutoxy) benzothiazole and 0.75 g. of para-toluene sulfonic acid ethyl were heated at 140° C. for four hours.

After cooling the solution, the quartenary salt was washed with acetone, and then 0.8 g. of 2-(4-acetoanilido-1,3-butadienyl)-3-ethyl benzothiazolium iodide, 130 ml of ethanol and 3 ml of triethylamine was added to the quartenary salt.

The resulting solution was boiled for 30 minutes under refluxing. After the reaction, the solution was condensed and isopropanol was added to it. After cooling, the precipitated dye was filtered off, and washed with isopropanol and then with water.

The crude crystal thus formed was twice recrystallized from a mixed solvent of chloroform, methanol and isopropanol.

The yield thereof was 0.8 g., m.p. 230° C. dec. $\lambda_{max.}^{MeOH}$ 661 m$\mu$.

SYNTHESIS 23

Anhydro 3,3'-diethyl-6'-(3-methyl-3-sulfopropoxy)thiacarbocyanine hydroxide (XIX)

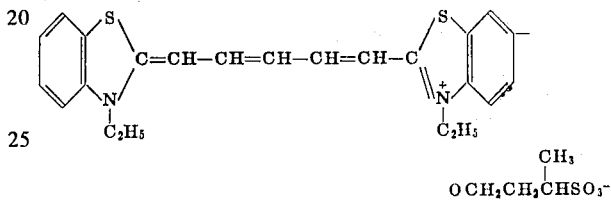

2 g. of sodium 2-methyl-6-(3-methyl-3-sulfopropoxy) benzothiazole and 1.5 g. of para-toluene sulfonic acid ethyl were heated at 140° C. for four hours. After cooling the solution, the quartenary salt was washed with ether, and then 1.8 g. of 2-(4-acetoanilide-1, 3-butadienyl)-3-ethylbenzo-thiazolium iodide, 150 ml. of ethanol and 4 ml. of triethylamine were added to the quartenary salt.

The resulting solution was boiled for 30 minutes under refluxing. After the reaction, the solution was condensed and cooled, and then ether was added to it. The precipitated dye was filtered off and twice recrystallized from a mixed solvent of chloroform, methanol and isopropanol.

The yield thereof was 1.7 g., m.p. 210° C. dec. $\lambda_{max.}^{MeOH}$ 662 m$\mu$.

SYNTHESIS 24

3,3'-diethyl-6'-($\beta$-carboxyethoxy)thiacarbocyanine iodide (XX)

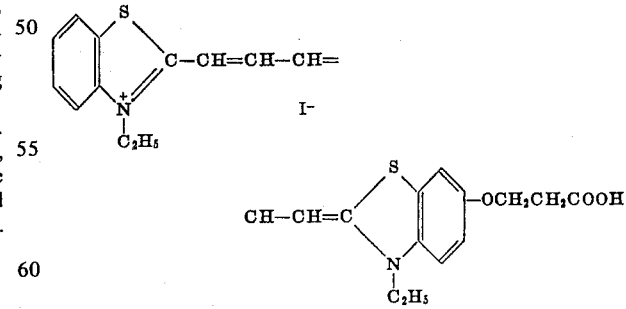

2 g. of 6-($\beta$-carboxyethoxy)-2-methyl benzothiazole and 1.2 g. of para-toluene sulfonic acid ethyl were heated at 165° C. for three hours to provide a quatenary salt. 2.8 g. of 2-(4-acetoanilide-1, 3-butadienyl)-3-ethyl benzothiazolium iodide, 40 ml. of ethanol and 3 ml. of triethylamine were added to the quartenary salt and the resulting solution was boiled for 40 minutes under refluxing. After the reaction, the solution was cooled and ether was added to it.

The ether layer thereof was removed off by decantation, and then water was added to the residual to provide a crystal of a dye. The crude crystal was filtered off and washed with water and further recrystallized from a mixed solvent of ethanol and chloroform.

The yield thereof was 1.7 g., m.p. 170° C. $\lambda_{max.}^{MeOH}$ 662 m$\mu$.

SYNTHESIS 25

Sodium anhydro 3-ethyl-3'-(3-sulfopropyl)-6'-(4-sulfobutoxy) thiacarbocyanine hydroxide (XXI)

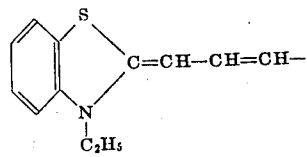

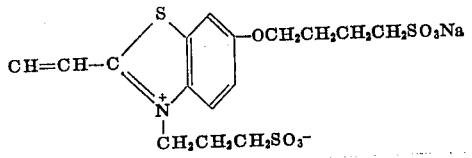

3 g. of sodium 2-methyl-6-(4-sulfobutoxy) benzothiazole and 1.5 g. of propanesultone were heated at 150° C. for three hours. After cooling the solution, the quartenary salt was washed with acetone. 2.6 g. of 2-(4-acetoanilido-1, 3-butadienyl)-3-ethyl benzothiazolium iodide, 100 ml. of ethanol, 50 ml. of methanol and 5 ml. of triethyl amine were added to the quartenary salt and the resulting solution was boiled for 30 minutes under refluxing. After the reaction, the solution was condensed and cooled. The precipitated dye was filtered off and washed with ethanol.

The crude crystal was recrystallized from a mixed solvent of methanol and water three times.

The yield thereof was 0.4 g., m.p. 252° C. dec. $\lambda_{max.}^{MeOH}$ 667.5 m$\mu$.

Now the examples of the sensitizing dyes used in this invention, other than above illustrated sensitizing dyes, are shown below.

Anhydro 3, 3'-diethyl-9-methyl-5'-(3-sulfopropoxy) thiacarbocyanine hydroxide (XXII)

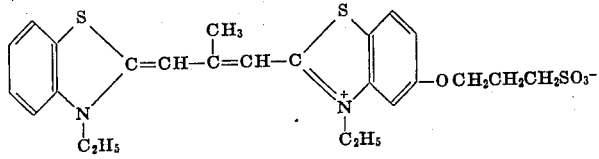

M.P. above 300° C. dec. $\lambda_{max.}^{MeOH}$ 552.5 m$\mu$.

Anhydro 1, 3'-diethyl-6-methyl-5'-(3-sulfopropoxy) thia-2-cyanine hydroxide (XXIII)

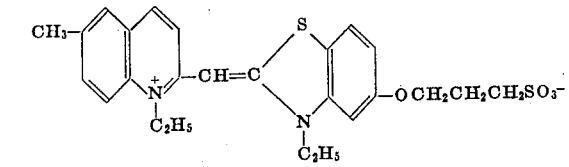

M.P. above 300° C. dec. $\lambda_{max.}^{MeOH}$ 499 m$\mu$.

Anhydro 4, 5-benz-3,3',9-triethyl-5'-(3-sulfopropoxy) thiacarbocyanine hydroxide (XXIV)

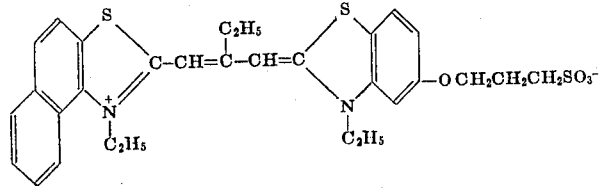

M.P. 259° C. dec. $\lambda_{max.}^{MeOH}$ 571 m$\mu$.

Anhydro 4, 5-benz-3,3'9-triethyl-5'-(3-sulfopropoxy) selenacarbocyanine hydroxide

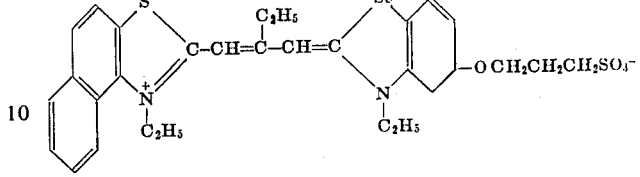

M.P. 261° C. dec. $\lambda_{max.}^{MeOH}$ 576 m$\mu$.

The novel sensitizing dyes of this invention are useful for enlarging the region of the spectral sensitization in gelatino-silver halide photographic emulsions as well as for photographic emulsions containing hydrophilic colloids other than gelatine, such as agar-agar, collodion, water soluble cellulose derivative, polyvinylalcohol, and other hydrophilic synthesis, natural resins and the like.

In a silver halide emulsion of this invention silver chloride, silver bromide, silver iodide or a mixed silver halide such as silver iodo-bromide, silver bromo-chloride, silver chloro-bromoiodide and the like were used.

In preparing a photographic emulsion containing at least one novel sensitizing dye used in this invention, the sensitizing dye was added to a photographic emulsion by the conventional manner.

Practically, the sensitizing dye solution dissolved in a proper solvent was incorporated in an emulsion. The concentration of the sensitizing dye was varied from 1 to 150 mg. per 1 kg of the emulsion according to the desired purpose.

The novel sensitizing dye used in this invention can be incorporated in a photographic emulsion sensitized by physical ripening or chemical ripening.

The silver halide photographic emulsion of this invention sensitized spectrally by a novel sensitizing dye. can be used for hyper-sensitization or super-sensitization by using the well-known techniques in the prior art.

Moreover, to the silver halide emulsion containing the aforesaid sensitizing dye of this invention may be added such additives as cyan couplers, stabilizers, antifoggants, toning agents, hardening agents, wetting agents, plasticizers, developing accelerators, fluorescent brightening agents and the like. The photographic silver halide emulsion thus spectrally sensitized can be applied to a support such as cellulose derivative films, plastic films, baryta papers and the like.

The present invention will now be explained by the following examples:

EXAMPLE 1

Table 1 shows the maximum sensitivity of a silver halide photographic emulsion sensitized by the novel sensitizing dyes of this invention.

The silver iodo-bromide emulsion used in this table contains 5 mol percent iodide and the silver chloro-bromide emulsion contains 40 mol percent bromide.

TABLE 1

| Sensitizing dye | Amount of the Dye per 100 g. of an emulsion ($10^{-3}$ mol/liter) | Maximum sensitivity wavelength (m$\mu$) | Silver halide |
| --- | --- | --- | --- |
| VII | 2 | 545 | Silver iodo-bromide. |
| VIII | 2 | 540 | Do. |
| XI | 4 | 636 | Do. |
| XII | 8 | 612 | Do. |
| XIV | 8 | 610 | Do. |
| XXII | 8 | 635 | Do. |
| XXIII | 8 | 540 | Do. |
| XXIV | 8 | 660 | Do. |
| XXV | 8 | 667 | Do. |
| XV | 0.4 | 701 | Silver bromo-chloride. |
| XVI | 0.6 | 707 | Do. |
| XVII | 0.2 | 703 | Do. |
| XVIII | 0.6 | 700 | Do. |
| XX | 0.6 | 701 | Do. |
| XXI | 0.2 | 700 | Do. |

EXAMPLE 2

To 100 g. of a silver iodo-bromide emulsion prepared by a conventional manner was added 6 ml. of each sensitizing dye solution in this invention or a conventional sensitizing dye (represented by the following formula XXVI) having the concentration of $10^{13}$ mol/liter. The resulting emulsion was allowed to stand for 30 minutes at 40° C. and thereafter a dispersion containing a coupler having the formula

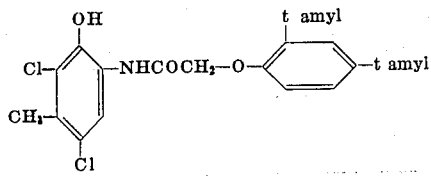

was added to it. After a short time, one aliquot was coated onto a film support and another aliquot was allowed to stand for two hours at 40° C. After that, the second aliquot was coated onto a film support. The resulting light-sensitive element was cut into a strip, and exposed in a light source of 2600° K in color temperature using a Fuji filter No. 7 (made by Fuji Photofilm Co., Ltd. in Japan).

The light sensitive emulsion layer thus exposed was developed in a developer having a composition described in table II for 3 minutes at 20° C.

The results obtained are shown in table III.

TABLE II

| | |
|---|---|
| N-methyl-para-aminophenol sulfate | 2.0 g. |
| Hydroquinone | 4.0 g. |
| Sodium sulfite | 40 g. |
| Sodium carbonate (anhydro) | 24 g. |
| Potassium bromide | 1 g. |
| Water to make | 1 liter |

TABLE III

| Sensitizing Dye | Relative Sensitivity (red) | |
|---|---|---|
| | on the moment after the preparation | 150 minutes after the preparation |
| XV | 100 | 98 |
| XVIII | 100 | 100 |
| XX | 100 | 70 |
| XXVI *(control) | 100 | 35 |

The red sensitivity immediately after preparation is shown as 100. *the structure of XXVI is:

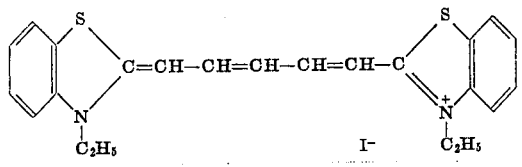

Table III shows that the sensitizing dye used in this invention provides the satisfied spectral sensitivity to a photographic emulsion and does not cause reduction of spectral sensitivity, when the emulsion is held in an emulsion state, prior coating on a support.

What is claimed is:

1. A photographic silver halide emulsion containing at least one sensitizing dye selected from the group consisting of a compound represented by formula I

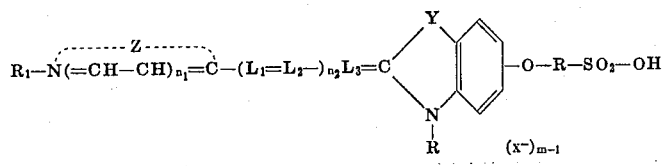

and a compound represented by Formula II

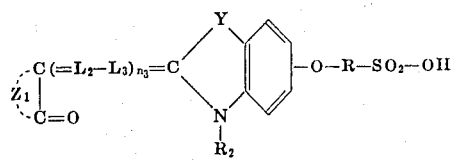

wherein Y represents a member selected from the group consisting of S and Se; Z represents the nonmetallic atoms necessary to complete a heterocyclic ring selected from the group consisting of thiazoles, thiadiazoles, benzothiazoles, napthothiazoles, oxazoles, benzoxazoles, naphthoxazoles, selenazoles, benzoselenazoles, naphthoselenazoles, thiazolines, oxazolines, selenazolines, indolenines, pyridines, 2-quinolines, 4-quinolines, and benzimidazoles; $Z_1$ represents the nonmetallic atoms necessary to complete a heterocyclic ring selected from the group consisting of rhodanines, pyrazolones, 2-thiohindantoines, isoxazolones, oxyindoles, 2-thiobarbatolic acids, and 2-thio-2,4-oxazolidinediones; R represents a divalent hydrocarbon group having one-fourth carbon atoms; $R_1$ and $R_2$ each represent a member selected from the group consisting of an alkyl group having one-fourth carbon atoms and a substituted alkyl group wherein the substituent is hydroxy, acetoxy, carboxy, sulfo-vinyl, phenyl and phenoxy; $L_1$, $L_2$ and $L_3$ each represents a methine group; X represents an anion; $n$ represents a member selected from the group consisting of 0 and 1; $n_2$ represents a member selected from the group consisting of 0, 1 and 2; $n_3$ represents a member selected from the group consisting of 1 and 2; and $m$ represents a member selected from the group consisting of 1 and 2.

2. A photographic silver halide emulsion as claimed in claim 1, wherein said sensitizing dye represents a compound selected from

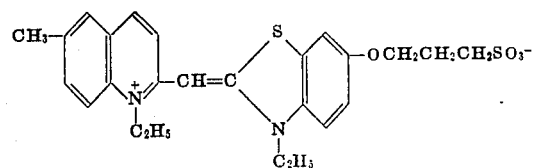

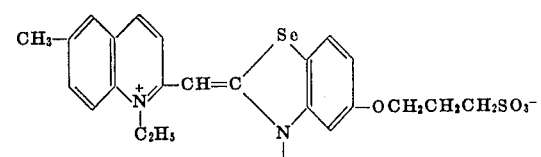

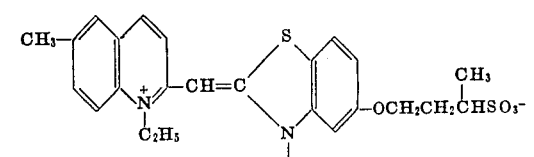

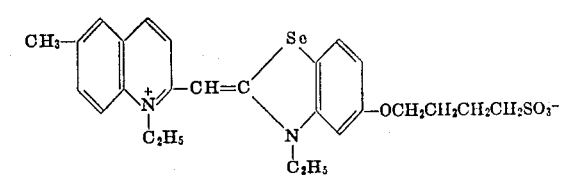

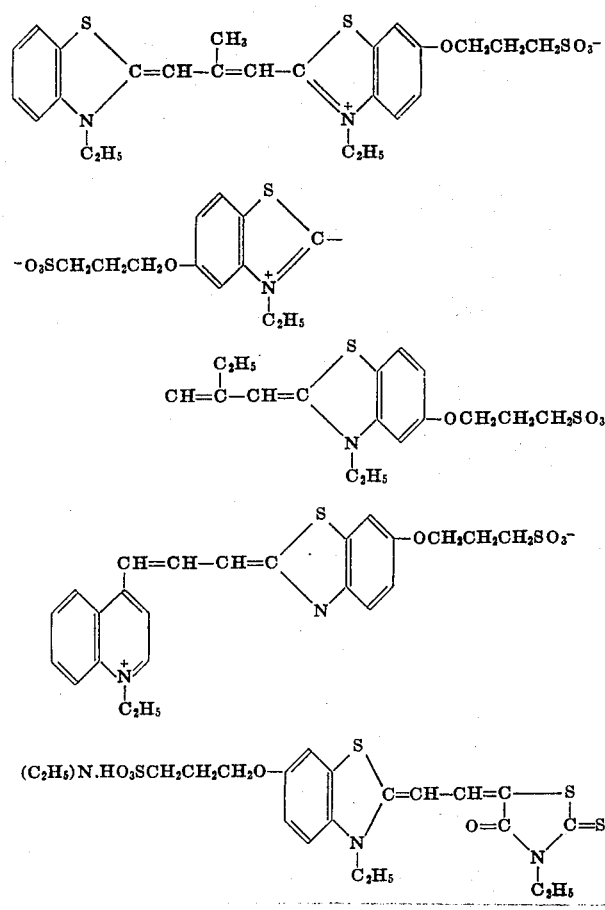
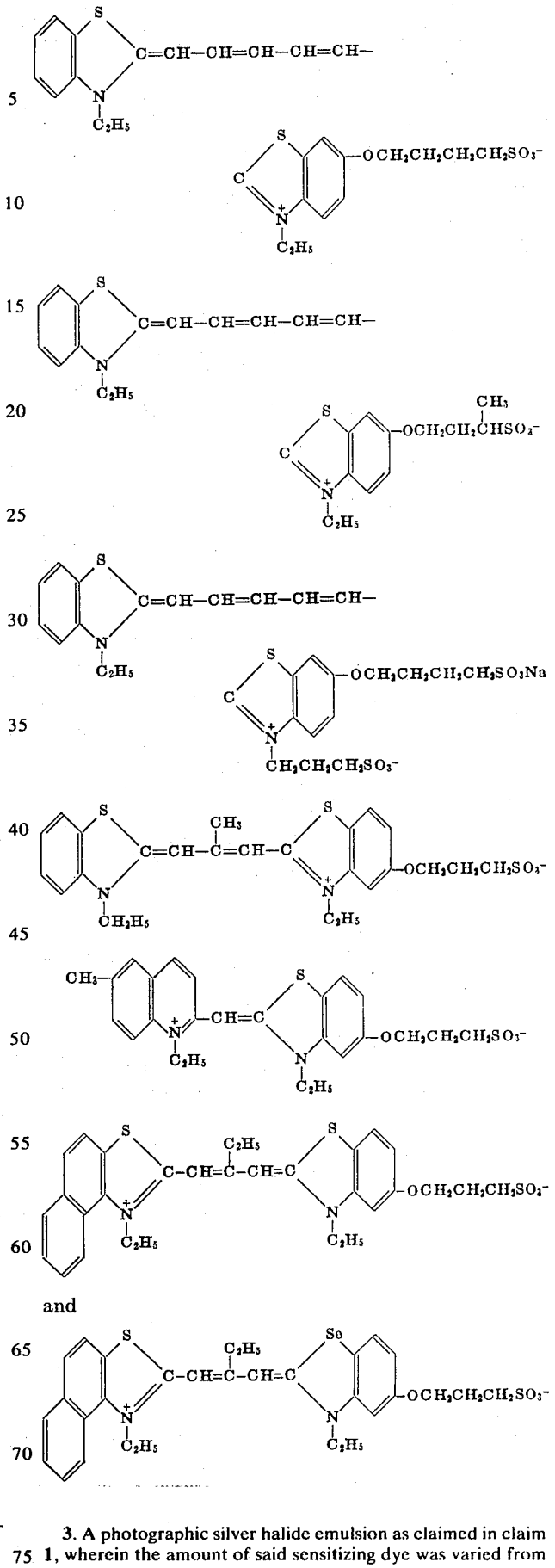
3. A photographic silver halide emulsion as claimed in claim 1, wherein the amount of said sensitizing dye was varied from 1 to 150 mg. per 1 Kg. of the emulsion.